United States Patent Office 3,449,263
Patented June 10, 1969

3,449,263
OLEFIN POLYMERIZATION PROCESS
William Russell Watt, Princeton Junction, N.J., assignor to American Can Company, New York, N.Y., a corporation of New Jersey
No Drawing. Filed Feb. 16, 1966, Ser. No. 527,735
Int. Cl. B01j 11/40; C08f 1/34
U.S. Cl. 252—429                                  14 Claims

ABSTRACT OF THE DISCLOSURE

Alpha olefins are polymerized either singly or in admixture under appropriate conditions in the presence of a catalyst mixture containing (a) an aluminum dihalide having the formula $RAlX_2$ where R is a hydrocarbon radical containing 1 to 12 carbon atoms and selected from the group consisting of alkyl, aryl and aralkyl hydrocarbon radicals, and X is a halogen selected from the group consisting of chlorine, bromine and iodine; (b) $TiX_3$ where X is defined above, and (c) an organotin compound having the formula $R_3SnAB$ where R is an alkyl hydrocarbon radical having from 1 to 12 carbon atoms, A can be O or S and B can be R or $SnR_3$.

---

This invention relates to a new and improved process for the polymerization of poly-1-olefins and, more particularly, to such a process utilizing a novel three-component catalyst system for polymerizing 1-olefins to high molecular weight polymers.

Heretofore, it has been shown that ethylene and higher 1-olefins can be polymerized by using a catalyst consisting of titanium trihalide and either a trialkylaluminum or a dialkylaluminum monohalide. In general, these catalysts are known as Zeigler-Natta catalysts and are used at relatively low temperatures and atmospheric pressure to produce crystalline materials, as contrasted with amorphous polymers. It is also equally well-known that a mixture of an alkylaluminum dihalide with a titanium trihalide is ineffective as a polymerization cataylst, for example, for polymerizing propylene, under similar conditions.

It is an object of the present invention to provide a three-component catalyst containing as two of the ingredients an alkylaluminum dihalide and a titanium trihalide, said three component system being capable of catalyzing ethylene and other 1-olefins to high molecular weight, crystalline polymers.

It is an additional object of the present invention to provide a novel polymerization process for the production of high molecular weight, crystalline polymers from ethylene and higher 1-olefins wherein said process is catalytically activated by the novel three-component catalyst herein disclosed.

Further objects will become apparent to those skilled in this art as the disclosure is more fully made.

In accordance with the present invention, the above objects are attained by polymerizing 1-olefins either singly or in admixture, under appropriate conditions in the presence of a catalytic mixture containing (a) an alkyl aluminum dihalide having the formula $RAlX_2$ wherein R is a hydrocarbon radical containing 1 to 12 carbon atoms and selected from the group consisting of alkyl, aryl and aralkyl, and X is a halogen selected from the group consisting of chlorine, bromine, and iodine, (b) $TiX_3$ wherein X is as defined above, and (c) an organo-tin compound. The organo-tin compound has the general formula: $R_3SnAQ$ wherein R represents an alkyl hydrocarbon radical having from 1 to 12 carbon atoms, including alkyl radicals such as methyl, ethyl, propyl, isopropyl, butyl, isobutyl, pentyl, octyl, etc.; A represents either O or S; and Q represents either R or $SnR_3$, wherein as defined above. Illustrative of the organo-tin compounds which are applicable to the present invention are bis-tributyltin oxide, bis-triisopropyltin oxide, tributyltin methoxide, and bis-tributyltin sulfide. Bis-tributyltin oxide is the preferred organo tin compound and the following disclosure will use that compound for illustrative purposes though it should be understood that other organo-tin compounds herein disclosed are considered to be applicable in substitution for the preferred compound. The catalytic activity of this three-component mixture was wholly unexpected since, as has been previously pointed out, the use of alkylaluminum dihalides, either singly or in combination with titanium trihalides, has been ineffective in the polymerization of alpha-olefins.

As has previously been mentioned, the improved results obtained as herein disclosed depend upon the use of the particular catalyst combination. The first component of the catalyst is an organo-aluminum dihalide having the formula $RAlX_2$ wherein R is a hydrocarbon radical containing 1 to 12 carbon atoms and selected from the group consisting of alkyl, aryl, and aralkyl, including methyl, ethyl, propyl, isopropyl, butyl, phenyl, napthyl, phenylethyl, phenylbutyl, etc. X represents a halogen selected from the group consisting of chlorine, iodine, and bromine. Illustrative compounds which fall within this general formula include: ethylaluminum dichloride, propylaluminum dichloride, butylaluminum dichloride, phenylaluminum dichloride, phenylethylaluminum dichloride, the corresponding dibromides and diiodides, etc. Ethylaluminum dichloride is the preferred organo-aluminum component.

The second component is a titanium halide having the formula $TiX_3$ wherein X is as defined above. Illustrative compounds include titanium trichloride, titanium tribromide, and titanium triiodide. It is also within the scope of the invention to produce the titanium trihalide in situ, for example by the reaction of titanium tetrahalide with an organometallic compound of a metal of Groups I-A, II-A, or III-A of the Periodic Table, as is well-known in the art. In any event, the preferred titanium compound is titanium trichloride. The alkylaluminum dihalide is used in a ratio of 0.5 to 12 moles per mole of titanium trichloride and preferably 1 to 3 moles per mole of titanium compound.

The third component of the catalyst is the organo-tin compound which has been adequately described above. These compounds can be prepared by procedures well-known in the art. For example, the preferred organo-tin compound is bis tributyltin oxide which can be prepared according to the procedures set forth in U.S. 2,862,944 to C. R. Gloskey, U.S. 2,868,820 to S. Nitzsche et al., etc. The organo-tin compound is used in a ratio of 0.3 to 1.2 moles per mole of alkylaluminum dihalide, and preferably 0.8 to 1.0 mole per mole of the organo-aluminum compounds.

The monomers which can be polymerized in accordance with the present invention are aliphatic 1-olefins having 2 to 8 carbon atoms. Specific examples of this group include ethylene, propylene, isobutylene, butene, hexene, heptene, octene, 3-methylbutene-1, 4-methylpentene-1 and the like, with propylene being considered the preferred monomer. The present invention is also applicable to the production of copolymers of the aforesaid aliphatic 1-olefins with organic compounds copolymerizable therewith, particularly those having ethylenic saturation. Such compounds include the aliphatic 1-olefins, diolefins, styrene, methylstyrene, vinylcyclohexane, etc.

The polymerization or copolymerization of the above listed monomers can be conducted in accordance with procedures and techniques well-known to those skilled in this art. The process can be carried out batchwise or in a continuous operation. In general, the reaction is carried out at a temperature of 0° to 200° C., preferably 25° to 100° C., under a pressure which can vary from atmospheric to several thousand pounds per square inch.

The reaction can be conducted in a gaseous phase, a liquid phase, or a mixed gas-liquid phase. Normally, it is desirable to have present a diluent or vehicle which aids in the control of the polymerization and which is chemically inert and non-deleterious to the catalyst under reaction conditions. Suitable diluents are the alkanes and cyclo-alkanes having 3 to 12 carbon atoms per molecule such as propane, butane, isobutane, pentane, isopentane, hexane, heptane, isooctane, dodecane, cyclopentane, cyclohexane, methylcyclohexane, dimethyl-cyclohexane, and the like; aromatic hydrocarbons having 6 to 12 carbon atoms per molecule are such as benzene, toluene, xylene, ethylbenzene, and the like; halogenated aromatic compounds such as chlorobenzene, dichlorobenzene, chloronapthalene, and the like; etc.

The actual pressure utilized is chosen to assure that the diluent, when a liquid diluent is used, is maintained as a liquid phase and that the olefinic monomers not liquified under the reaction conditions are dissolved in the liquid phase in sufficient amount. The pressure is ordinarily achieved by pressurizing the system with the monomer (or monomers) to be polymerized whereby a portion of the monomer is dissolved in the liquid diluent. Preferred pressures are on the order of 25 to 1000 p.s.i.

The reactants may be contacted with the catalyst in manners which are well-known to those skilled in the art. For example, a fixed bed catalyst bed may be used, or a fluidized bed, or where the catalyst is suspended in a diluent and maintained in suspension by agitation. The latter is the preferred method and the one which is most commonly employed. Where the catalyst is suspended in an inert diluent, the catalyst concentration is on the order of 0.1 to 4%, preferably 0.5 to 2%, based on the weight of the inert diluent.

Polymerization time can be varied as desired, but usually will be on the order of 0.5 to 24 hours in batch processes. In a continuous process the contact time in the polymerization zone can also be regulated as desired, the time generally applicable being on the order of 1 to 6 hours.

The following examples are set forth to more fully describe the practice of the present invention. They should not be considered as a limitation upon the scope of the invention, but merely as being illustrative thereof.

Example I

This example will illustrate the failure of an ethylaluminum dichloride-titanium trichloride catalyst to promote the polymerization of monomeric propylene.

100 ml. of dried and purified benzene was added to a nitrogen-flushed pressure bottle, and subsequently 4.85 millimoles ethylaluminum dichloride and 4 millimoles titanium trichloride were added to the benzene. The bottle was placed in constant temperature bath maintained at 70° C. and put under 40 p.s.i.g. pressure with propylene. After two hours, the volume of liquid inside the pressure bottle had approximately doubled and the reaction had to be stopped. The supernatant liquid was decanted from the catalyst, washed once with methanol and three times with 10% HCl (aq.), dried over anhydrous sodium carbonate, and distilled. Analysis by infrared, ultraviolet and gas chromatographic means identified the resultant liquid as predominately cumene, with varying amounts of 1,2- and 1,4-disubstituted alkyl benzene and 1,3,5 and 1,2,4,5-alkyl benzene. Thus, a catalyst consisting of ethylaluminum dichloride and titanium trichloride causes alkylation of benzene by propylene rather than polymerization of the propylene. This should be contrasted with the results of remaining examples wherein the novel caalysts of the present invention are utilized to polymerize monomeric propylene.

Examples 2-4

100 ml. of dried and purified benzene was added to a nitrogen flushed pressure bottle and subsequently 4.85 millimoles of ethylaluminum dichloride was added to the benzene. The bis-tributyltin oxide was then added, followed by the addition of 4.0 millimoles of titanium trichloride. The amount of bis-tributyltin oxide added in each example is set forth in Table I along with the molar ratio of bis-tributyltin oxide (TBTO) to ethylaluminum dichloride (EADC) and the amount of polymer obtained. The bottle was placed in a constant temperature bath maintained at 70° C. There was no noticeable increase in the volume of liquid inside the pressure bottle during this period. After 24 hours the catalyst was quenched by adding 10 ml. of methanol. The reaction mixture was filtered to remove the solid material, and the solid polymer retained on the filter was washed three times with methanol and then dried for 16 hours in a vacuum oven maintained at 60° C. The polymer had a melting point of 161° C., as determined by differential thermal analysis.

TABLE I

| Ex. | TBTO, millimoles | Molar ratio TBTO/EADC | Polymer, grams |
|---|---|---|---|
| 2 | 0.16 | 0.033 | 3.1 |
| 3 | 0.79 | 0.16 | 6.6 |
| 4 | 3.9 | 0.81 | 2.1 |

The polypropylene prepared as described above was successively extracted for 16 hours with diethyl ether, acetone, pentane, and heptane. The insolubility of the polymer in each extractant was as follows:

Extractant: Percent insoluble polymer
Diethyl ether _____ 92.0
Acetone _____ 92.0
Pentane _____ 91.0
Heptane _____ 84.0

Example 5

100 ml. of dried heptane was added to a pressure bottle and 2.9 millimoles ethylaluminum dichloride and 1.4 millimoles tributyltin methoxide were added. After stirring for one hour at 70° C., 1.4 millimoles titanium trichloride was added and the bottle was put under 35 p.s.i.g. pressure with propylene. During the 18 hour period of agitation at 35 p.s.i.g. and 70° C., 0.13 gram of polypropylene was obtained.

Example 6

50 ml. of dried heptane was added to a pressure bottle and 2.9 millimoles ethylaluminum dichloride and 1.1 millimoles bis-tributyltin sulfide were added. After stirring for one hour at 70° C., 1.4 millimoles titanium trichloride was added. During a 5 hour agitation of the reaction mixture at 70° C. under 35 p.s.i.g. propylene, 0.1 gram polypropylene was obtained.

Examples 7-14

A series of tests was run to demonstrate the effect of varying amounts of bis-tributyltin oxide. Constant conditions were used and the amount of ethylaluminum dichloride and titanium trichloride used was the same in each test. Polymerization was carried out in 100 ml. of anhydrous benzene under 40 p.s.i.g. of propylene for 5 hours at 70° C. In each test, 4.84 millimoles of ethylaluminum dichloride and 1.42 millimoles of titanium trichloride (Stauffer Chemical Company, AA grade) with varying amounts of bis-tributyltin oxide as shown in the table.

| Ex. No. | Millimoles bis-tributyltin oxide | Molar ratio Al/Ti/TBTO | Grams polymer |
| --- | --- | --- | --- |
| 7 | 1.25 | 3.4/1/0.87 | 0.9 |
| 8 | 2.50 | 3.4/1/1.8 | 0.7 |
| 9 | 3.12 | 3.4/1/2.2 | 0.5 |
| 10 | 3.74 | 3.4/1/2.6 | 4.8 |
| 11 | 4.06 | 3.4/1/2.9 | 5.1 |
| 12 | 4.37 | 3.4/1/3.1 | 5.9 |
| 13 | 4.68 | 3.4/1/3.3 | 4.3 |
| 14 | 4.99 | 3.4/1/3.5 | 4.1 |

Polymer was recovered by mixing the polymerization mixture with 300 ml. of isopropanol in a Waring Blendor and filtering. The polymer was washed twice with methanol in the blendor, then dried 17 hours at 60° C. under vacuum.

Example 15

To demonstrate the effect of diluent on polymer yield, benzene was used as a diluent. In this test, 4.84 millimoles of ethylaluminum dichloride, 4.39 millimoles of bis-tributyltin oxide and 1.42 millimoles of titanium trichloride were added to 100 ml. of diluent in a glass reactor. The reactor was maintained at 70° C. under 40 p.s.i.g. of propylene for 5 hours with stirring. At the end of this time the reaction mixture was poured into 300 ml. of isopropanol, stirred vigorously and filtered. The polymer was washed twice with methanol in the blendor and dried 17 hours in a vacuum oven at 60° C. 6.2 grams of solid polymer were produced.

Example 16

Using heptane as the diluent, the procedure was the same as in Example 15. Only 2.8 grams of solid polymer were produced.

The polymers prepared in accordance with the present invention can be molded or extruded or can be used to form a variety of products. The polymers can be extruded in the form of tubing of excellent rigidity or can be injection molded into a great variety of useful articles. Fibers can be also prepared from the polymers obtained according to the process.

While the invention has been described with reference to preferred embodiments thereof, it will be understood by those skilled in the art that various changes in form and details may be made therein without departing from the true spirit and scope of the invention.

I claim:

1. A polymerization catalyst comprising an aluminum dihalide having the formula $RAlX_2$ where R is a hydrocarbon radial selected from the group consisting of alkyl, aryl and aralkyl radicals and X is a halogen selected from the group consisting of chlorine, bromine and iodine; a titanium trihalide and an organo-tin compound having the formula $R_3SnAQ$ wherein R is an alkyl hydrocarbon radical having 1 to 12 carbon atoms, A is selected from the group consisting of O and S, and Q is selected from the group consisting of R and $SnR_3$ wherein R is as defined above, said aluminum dihalide being present in said catalyst in a concentration of from about 0.5 to about 12 moles per mole of said titanium trihalide, and said organo-tin compound being present in said catalyst in a concentration of from about 0.3 to about 1.2 moles per mole of said aluminum dihalide.

2. The catalyst of claim 1 wherein the aluminum dihalide is ethylaluminum dichloride.

3. The catalyst of claim 1 wherein the titanium trihalide is titanium trichloride.

4. The catalyst of claim 3 wherein the titanium trichloride is produced in situ.

5. The catalyst of claim 1 wherein the organo-tin compound is bis-tributyltin oxide.

6. The catalyst of claim 1 wherein the organo-tin compound is bis-triisopropyltin oxide.

7. The catalyst of claim 1 wherein the organo-tin compound is tributyltin methoxide.

8. The catalyst of claim 1 wherein the organo-tin compound is bis-tributyltin sulphide.

9. The catalyst of claim 1 wherein the aluminum dihalide is ethylaluminum dichloride, the titanium trihalide is titanium trichloride, and the organo-tin compound is bis-tributyltin oxide.

10. In a process for the polymerization of a 1-olefin having 3 to 8 carbon atoms the improvement which comprises effecting the polymerization in the presence of the catalyst of claim 1.

11. The process of claim 10 wherein the polymerization is effected in an inert diluent.

12. The process of claim 11 wherein the catalyst concentration is on the order of 0.1 to 4% based on the weight of said inert diluent.

13. The process of claim 10 wherein the 1-olefin is propylene.

14. The process of claim 13 wherein the aluminum dihalide is ethylaluminum dichloride, the titanium trihalide is titanium trichloride, and the organo-tin compound is bis-tributyltin oxide.

References Cited

UNITED STATES PATENTS

| 3,108,126 | 1/1957 | Crauland | 260—429.7 |
| 2,745,820 | 6/1949 | Mack | 260—45.75 |
| 2,801,258 | 7/1957 | Johnson | 260—429.5 |
| 2,683,705 | 7/1954 | Anspon | 260—89.5 |
| 3,034,992 | 5/1962 | Tornquist | 252—429 |
| 3,313,791 | 4/1967 | Price et al. | |
| 3,328,375 | 6/1967 | Price. | |

FOREIGN PATENTS 657,902   2/1963   Canada.

PATRICK P. GARVIN, Primary Examiner.

U.S. Cl. X.R.

260—88.2, 93.7, 94.9